United States Patent

Hugl et al.

[11] 4,231,748
[45] Nov. 4, 1980

[54] AZO DYESTUFFS

[75] Inventors: Herbert Hugl; Gerhard Wolfrum, both of Leverkusen, Fed. Rep. of Germany

[73] Assignee: Bayer Aktiengesellschaft, Leverkusen, Fed. Rep. of Germany

[21] Appl. No.: 962,960

[22] Filed: Nov. 22, 1978

[30] Foreign Application Priority Data

Nov. 24, 1977 [DE] Fed. Rep. of Germany ....... 2752424

[51] Int. Cl.³ .......................... D06P 1/18; C09B 29/01
[52] U.S. Cl. ............................................ 8/668; 8/666; 260/163
[58] Field of Search ..................... 8/41 R, 41 B, 41 C; 260/163

[56] References Cited

U.S. PATENT DOCUMENTS

| | | | |
|---|---|---|---|
| 3,344,133 | 9/1967 | Bossard et al. ........................ | 260/163 |
| 3,471,468 | 10/1969 | Bossard et al. ........................ | 260/163 |
| 3,803,122 | 4/1974 | Kilmurry ............................... | 8/41 B |

*Primary Examiner*—John Kight, III
*Attorney, Agent, or Firm*—Sprung, Felfe, Horn, Lynch & Kramer

[57] ABSTRACT

Polyester fibres are dyed in yellow and orange-red color shades with good fastness to light and wet processing when dyestuffs of the formula

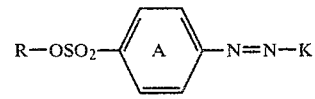

wherein
K denotes the radical of a 5-amino-pyrazole coupling component which couples in the 4-position,
R denotes an optionally substituted alkyl, cycloalkyl, aralkyl or aryl radical and the ring A can contain further non-ionic substitutents customary in dyestuff chemistry, are used.

2 Claims, No Drawings

AZO DYESTUFFS

The invention relates to disperse dyestuffs of the formula

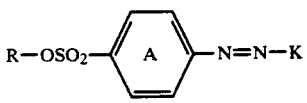

(I)

wherein

K denotes the radical of a 5-amino-pyrazole coupling component which couples in the 4-position, R denotes an optionally substituted alkyl, cycloalkyl, aralkyl or aryl radical and the ring A can contain further non-ionic substituents customary in dyestuff chemistry.

Preferred dyestuffs correspond to the formula

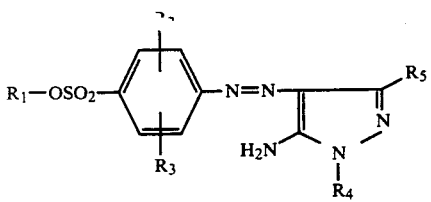

wherein $R_1$ represents alkyl or aryl, $R_2$ represents hydrogen, halogen, CN, $CF_3$, $NO_2$, $Q_1$, $-OQ_1$, $-COOQ_1$, $-CONQ_1Q_2$ or $NHCOQ_1$, $R_3$ represents hydrogen, halogen, $CF_3$, $Q_1$ or $OQ_1$, $R_4$ represents $Q_2$, aryl, cycloalkyl or a radical of a heterocyclic compound and $R_5$ represents $Q_1$, $-COOQ_2$ or $-CON(Q_2)_2$, wherein $Q_1$ denotes alkyl or aryl and $Q_2$ denotes hydrogen, alkyl or aralkyl.

The abovementioned alkyl, aralkyl, cycloalkyl and aryl radicals can contain further non-ionic substituents or the radical COOH.

Within the scope of this invention, suitable alkyl is, in particular, alkyl with 1 to 4 C atoms, which can be optionally further monosubstituted by cyano, halogen, such as chlorine, bromine or fluorine, hydroxyl or $C_1$-$C_4$-alkoxy, for example methyl, ethyl, n-propyl, iso-propyl, n-butyl, tert.-butyl, cyanoethyl or 2-chloroethyl.

Suitable aryl is, in particular, phenyl which is optionally monosubstituted to trisubstituted by halogen, $C_1$-$C_4$-alkyl, $C_1$-$C_4$-alkoxy, nitro, cyclohexyl or phenyl.

"Bulky" radicals are in those positions where they cause no steric hindrance, for example tert.-butyl is in the m-position or p-position of a phenyl radical.

Suitable halogen is chlorine, bromine or fluorine, but preferably chlorine.

Suitable heterocyclic radicals are the 2-thienyl radical and, above all, the 3-thiacyclopentyl radical.

Suitable aralkyl is, for example, benzyl or phenethyl.

Suitable cycloalkyl is, for example, cyclopentyl, cyclohexyl and cycloheptyl.

Particularly preferred dyestuffs are those of the formula

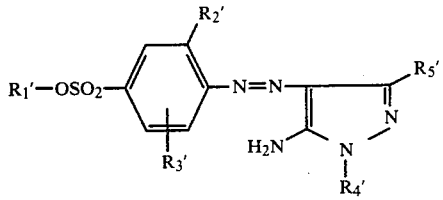

wherein $R_1'$ represents phenyl which is optionally monosubstituted to trisubstituted by $C_1$-$C_4$-alkyl, chlorine, nitro, cyclohexyl or phenyl, $R_2'$ stands halogen, cyano, trifluoromethyl, nitro, $C_1$-$C_4$-alkyl or $C_1$-$C_4$-alkoxy, $R_3'$ stands H, halogen, trifluoromethyl, $C_1$-$C_4$-alkyl or $C_1$-$C_4$-alkoxy, $R_4'$ stands hydrogen, $C_1$-$C_4$-alkyl or phenyl and $R_5'$ stands $C_1$-$C_4$-alkyl.

Very particularly preferred dyestuffs are those of the formula

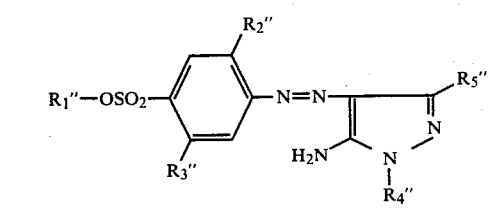

wherein $R_1''$ represents phenyl, tolyl or chlorophenyl, $R_2''$ and $R_3''$ represent chlorine, $R_4''$ represents phenyl and $R_5''$ represents methyl.

The new dyestuffs are prepared in a manner which is in itself known by customary diazotisation reactions and coupling reactions.

The dyestuffs according to the invention are of very high tinctorial strength and are suitable for dyeing synthetic fibre materials, in particular polyamides, such as, for example, polycaprolactam, polyhexamethylenediamine adipate or polyaminoundecanoic acid, but very particularly polyesters, such as polyethylene terephthalate and poly-1,4-cyclohexanedimethylene terephthalate, from aqueous liquors or organic solvents. The types of fibre mentioned are dyed in deep yellow to orange-red shades with good fastness properties in use, such as, for example, fastness to light and wet processing.

EXAMPLE 1

35 g of 4-amino-2,5-dichloro-benzenesulphonic acid 3-chloro-phenyl ester are suspended in 400 ml of water and 30 ml of concentrated hydrochloric acid.

A 10% strength sodium nitrite solution is added dropwise at 0°-5° C. in the course of 15 minutes. After stirring the mixture for one hour at the temperature indicated, the excess nitrite is destroyed with amidosulphonic acid. This diazonium salt suspension is then added dropwise to a solution of 18 g of 1-phenyl-3-methyl-5-amino-pyrazole and 60 ml of concentrated hydrochloric acid at 0°-5° C. in the course of 30 minutes. After stirring the mixture for 1 hour, the pH value is adjusted to 5 by slowly adding 10% strength sodium hydroxide solution. As soon as coupling to give the dyestuff is complete, the precipitate is filtered off, washed and dried. About 40 g of a dyestuff of the formula

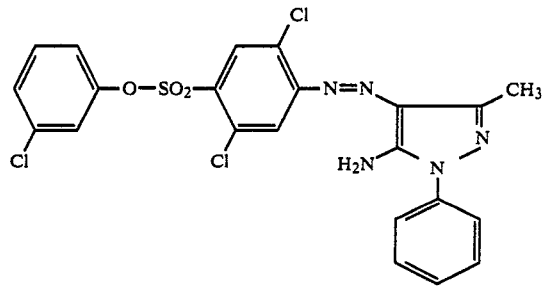

are obtained.

DYEING EXAMPLES (1) 1 part of the dyestuff obtained according to Example 1, finely dispersed by customary processes, is stirred into 2,000 parts of water. A pH value of 5 to 6 is established with acetic acid, and 4 parts of ammonium sulphate and 2 parts of a commercially available dispersing agent based on a condensation product of naphthalenesulphonic acid and formaldehyde are added. 100 parts of a polyester fabric based on polyethylene glycol terephthalate are introduced into the dye liquor thus obtained and dyeing is carried out at 120°–130° C. for 1½ hours. After subsequent rinsing, reductive after-treatment with a 0.2% strength alkaline sodium dithionite solution at 60° C. for 15 minutes, rinsing and drying, a reddish-tinged yellow dyeing with good fastness properties, in particular good fastness to light and sublimation, is obtained.

(2) 100 parts of a fabric made of polyethylene terephthalate fibres are introduced, at room temperature, into a dyebath which is prepared from 1 part of the monoazo dyestuff of Example 1 and 1,000 parts of tetrachloroethylene. The bath is heated to 110° C. in the course of 20 minutes, whilst vigorously circulating the liquor, and is kept at this temperature for 45 minutes. The liquor is then separated off and the fabric is rinsed with fresh tetrachloroethylene at 40° C. After separating off the rinsing liquor, the dyed material is freed from adhering solvent by spinning and drying in a stream of air. A strong reddish-tinged yellow dyeing with good general fastness properties is obtained.

(3) 0.1 g of the well-dispersed dyestuff according to Example 1 is introduced, at 40° C. into 1 l of water, which also contains 0.2 g of sodium dinaphthylmethanesulphonate and 0.3 g of cresotic acid methyl ester. 10 g of a fabric made of polyethylene terephthalate are introduced into this bath, the temperature of the dyebath is increased to 100° C. in the course of about 20 minutes and dyeing is carried out at this temperature for 60–90 minutes. A strong reddish-tinged yellow dyeing with good fastness to sublimation and light is obtained.

Similar dyestuffs which have similar properties to that obtained according to Example 1 are formed when the following diazo components containing sulphonic acid ester groups are diazotised and the diazotisation products are coupled to the following 5-amino-pyrazole coupling components. The dyestuffs dye synthetic fibre materials, such as polyesters and polyamides, in the colour shades indicated, with good fastness properties, for example good fastness to light, wet processing and sublimation.

| Example | Diazo component | Coupling component | Colour shade |
|---|---|---|---|
| 2 | 4-amino-2,5-dichloro-benzenesulphonic acid 3-methyl-phenyl ester | 1-phenyl-3-methyl-5-amino-pyrazole | yellow |
| 3 | 4-amino-2,5-dichloro-benzenesulphonic acid 4-methyl-phenyl ester | 1-ethyl-3-methyl-5-amino-pyrazole | yellow |
| 4 | 4-amino-2,5-dichloro-benzenesulphonic acid 2-chloro-phenyl ester | 3-methyl-5-amino-pyrazole | yellow |
| 5 | 4-amino-2,5-dichloro-benzenesulphonic acid 4-chloro-phenyl ester | 1-(2-chloro-phenyl)-3-methyl-5-amino-pyrazole | yellow |
| 6 | 4-amino-2,5-dichloro-benzenesulphonic acid 2,4-dichloro-phenyl ester | 1-cyclohexyl-3-methyl-5-amino-pyrazole | yellow |
| 7 | 4-amino-2,5-dichloro-benzenesulphonic acid 2-ethyl-phenyl ester | 1-benzyl-3-methyl-5-amino-pyrazole | yellow |
| 8 | 4-amino-2,5-dichloro-benzenesulphonic acid 3,5-dimethyl-phenyl ester | 1-(2-phenethyl)-3-methyl-5-amino-pyrazole | yellow |
| 9 | 4-amino-2,5-dichloro-benzenesulphonic acid 4-nitro-phenyl ester | 1-[4-(N,N-bis-(2-hydroxyethyl)-sulphamoyl)-naphth-1-yl]-3-methyl-5-amino-pyrazole | yellow |
| 10 | 4-amino-3-chloro-benzenesulphonic acid 2,4,5-trichloro-phenyl ester | 1-ethyl-3-carboxybutyl-5-amino-pyrazole | yellow |
| 11 | 4-amino-3-nitro-benzenesulphonic acid 4-chloro-2-methyl-phenyl ester | 1-phenyl-3-(N-ethyl-carbamoyl)-5-amino-pyrazole | yellow |
| 12 | 4-amino-2-chloro-5-cyano-benzenesulphonic acid 2-ethyl-phenyl ester | 1-(3-hydroxypropyl)-3-methyl-5-amino-pyrazole | yellow |
| 13 | 4-amino-2,5-dimethyl-benzenesulfonic acid 2,3-dimethyl-phenyl ester | 1-(1,2,2-trimethyl-2-hydroxy-ethyl)-3-methyl-5-amino-pyrazole | yellow |
| 14 | 4-amino-3-chloro-6-methoxy-benzenesulphonic acid 2,4-dimethyl-phenyl ester | 1-phenyl-3-methyl-5-amino-pyrazole | yellow |
| 15 | 4-amino-2-methoxy-5-nitro-benzenesulphonic acid 4-chloro-2,5-dimethyl-phenyl ester | 1-benzyl-3-methyl-5-amino-pyrazole | yellow |
| 16 | 4-amino-3-ethoxy-benzenesulphonic acid 2,5-dimethyl-phenyl ester | 1-phenyl-3-(N,N-dimethyl-carbamoyl)-5-amino-pyrazole | yellow |
| 17 | 4-amino-2,5-di-trifluoromethyl-benzenesulphonic acid 2-isopropyl phenyl ester | 1-(2,5-dichloro-phenyl)-3-methyl-5-amino-pyrazole | yellow |
| 18 | 4-amino-3-trifluoromethyl-benzenesulph- | 1-m-tolyl-3-methyl-5-amino-pyrazole | yellow |

-continued

| Example | Diazo component | Coupling component | Colour shade |
|---|---|---|---|
|  | onic acid 4-tert.-butyl-phenyl ester |  |  |
| 19 | 4-amino-2,5-dichloro-benzenesulphonic acid 2-isopropyl-5-methyl-phenyl ester | 1-(3-thiacyclopentyl)-3-methyl-5-amino-pyrazole S-dioxide | yellow |
| 20 | 4-amino-3-methyl-benzenesulphonic acid x-nonyl-phenyl ester | 1,3-diethyl-5-amino-pyrazole | yellow |
| 21 | 4-amino-3-trifluoromethyl-benzenesulphonic acid 4-cyclohexyl-phenyl ester | 1-ethyl-3-carboxymethyl-5-amino-pyrazole | yellow |
| 22 | 4-amino-3-chloro-5-methyl-benzenesulphonic acid 4-phenyl-phenyl ester | 1-iso-propyl-3-methyl-5-amino-pyrazole | yellow |
| 23 | 4-amino-3-carboxymethyl-benzenesulphonic acid phenyl ester | 1-hexyl-3-methyl-5-amino-pyrazole | yellow |
| 24 | 4-amino-3-acetylamino-benzenesulphonic acid 3-methyl-phenyl ester | 1-(2-cyanoethyl)-3-methyl-5-amino-pyrazole | yellow |
| 25 | 4-amino-2,5-dichloro-benzenesulphonic acid butyl ester | 1-(2-trifluoromethyl-phenyl)-3-methyl-5-amino-pyrazole | yellow |
| 26 | 4-amino-3-trifluoromethyl-benzenesulphonic acid cyclohexyl ester | 1-[4-(N,N-bis-(2-hydroxy-ethyl)-sulphamoyl)-phenyl]-3-methyl-5-amino-pyrazole | yellow |
| 27 | 4-amino-3-chloro-benzenesulphonic acid octyl ester | 1-(2-hydroxyethyl)-3-phenyl-5-amino-pyrazole | yellow |
| 28 | 4-amino-benzenesulphonic acid 3-methyl-cyclohexyl ester | 1-phenyl-3-methyl-5-amino-pyrazole | yellow |
| 29 | 4-amino-2,5-dichloro-benzenesulphonic acid ethyl ester | " | yellow |
| 30 | 4-amino-2,5-dichloro-benzenesulphonic acid phenyl ester | " | yellow |

We claim:
1. Disperse azo dyestuffs of the formula

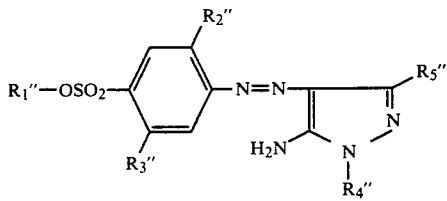

wherein
$R_1''$ represents phenyl, tolyl, or chlorophenyl,
$R_2''$ and $R_3''$ represent chlorine,
$R_4''$ represents phenyl and
$R_5''$ represents methyl.

2. Azo dyestuff according to claim 1, of the formula

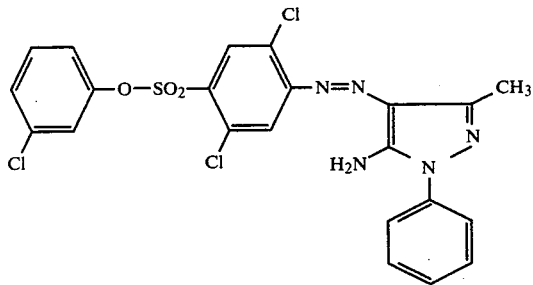

* * * * *